May 29, 1923.
W. G. WILSON
VEHICLE WHEEL
Filed Sept. 25, 1922
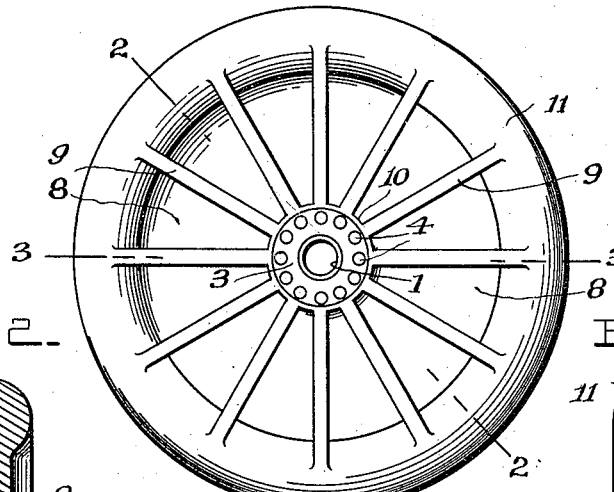
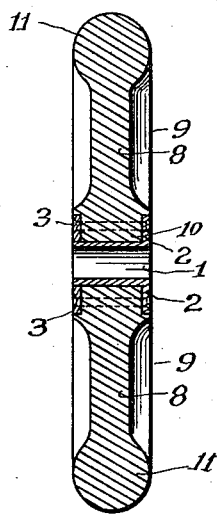
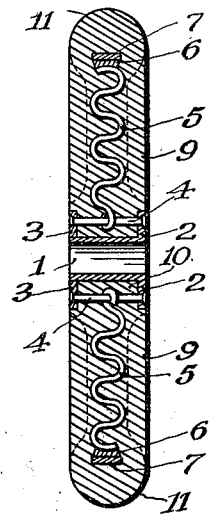
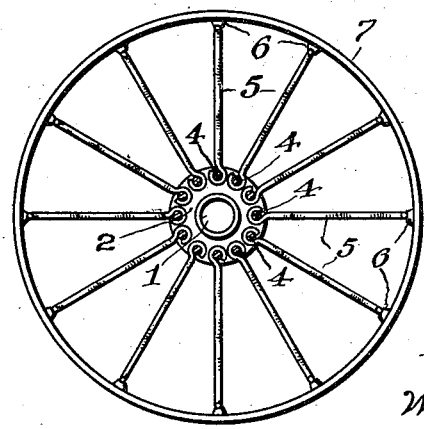
Inventor
William G. Wilson
Attorney Patented May 29, 1923.

1,457,013

UNITED STATES PATENT OFFICE.

WILLIAM G. WILSON, OF BRIDGEPORT, CONNECTICUT.

VEHICLE WHEEL.

Application filed September 25, 1922. Serial No. 590,396.

*To all whom it may concern:*

Be it known that I, WILLIAM G. WILSON, a citizen of the United States, residing at the city of Bridgeport, in the county of Fairfield and State of Connecticut, have invented certain new and useful Improvements in Vehicle Wheels; and I do declare the following to be a full, clear, and exact description of the invention, such as will enable others skilled in the art to which it appertains to make and use the same.

This invention has reference to wheels for automobiles, but more particularly refers to certain improvements on the construction shown and described in Letters Patent No. 1,386,389, issued August 2, 1921, jointly to me and to Charles Hudak.

In the Letters Patent aforesaid, the construction therein shown and described made no provisions as against the crawling displacement of the serpentine shaped pieces, and the present invention aims to overcome this defect and to provide a wheel in which the reenforcing parts shall be firmly held in position, and so that there can be no wrenching of the spokes at either end.

The particular features of the invention consist in reenforcing the spokes by means of serpentine shaped pieces of wire or rods molded in the spokes the inner ends of said pieces being anchored to a metallic part of the frame while the outer extremities of said pieces are secured to an encompassing metal rim, so that there can be no undue wrenching of the spokes either at the inner or outer ends. Furthermore, this invention particularly consists in providing means at the outer ends of said serpentine pieces so that the latter will not work outwardly through the rubber.

In the drawings—

Figure 1 is a side elevation of the invention—

Figure 2 a section at the line 2—2 of Figure 1—

Figure 3 a section at the line 3—3 of Figure 1, and

Figure 4 is an elevation of the metallic structure of the wheel before the rubber part is molded thereto.

Similar numerals of reference denote like parts in the several figures of the drawing.

In proceeding in accordance with the present invention, a steel bushing 1 having at one side a flanged head 2 is provided, and to the opposite side of this bushing is welded a flange 3, and through these flanges 2 and 3 extend bolts 4 which are riveted or otherwise secured to the flanges so that the ends of the bolts are flush with the outer surfaces of the flanges.

5 are serpentine shaped pieces of wire or rods which are as many in number as the bolts, and the inner extremity of each serpentine piece is secured to one of the bolts, while to the outer end of each serpentine piece is welded a flat cap 6 which is comparatively broad with respect to the thickness of the serpentine piece.

7 is a thin steel hoop or rim which surrounds the entire system of serpentine shaped pieces, and is shrunk on the cap 6 or rigidly secured thereto by screws.

The parts heretofore described constitute the frame or skeleton portion of the wheel as it appears before it is placed in the mold wherein the rubber element is molded to the frame so as to entirely surround the bolts and to contain the serpentine shaped pieces, the end caps, and the surrounding ring.

In this bolting process the side flanges 2 and 3 are embedded in the rubber so as to be flush therewith, so that it will be clear that there are no metal parts that protrude beyond the rubber.

It is quite essential that these serpentine shaped pieces 5 are anchored or tied at their ends, because this effectually prevents the crawling of these pieces, and, furthermore, since these pieces are all tied or connected to substantially the same element, the effective action of the wheel, so far as the various spokes are concerned, is thereby rendered more uniform.

While the end caps 6 are themselves quite effective, so far as preventing the outward crawling of the serpentine shaped pieces is concerned, nevertheless, the encircling rim or hoop 7 is quite desirable and advantageous, although it is not desired that the invention be limited to the use of this hoop.

The molded rubber not only forms the spokes 9, but it also forms web-like portions 8 which extend throughout the space between the spokes, as well as the hub 10 and tread 11.

The spokes are disposed in pairs that are diametrically opposite so that the action of the reenforcing elements is rendered still more uniform.

From the foregoing it will be clear that a wheel is provided with a continuous ring-like body between the hub and the tread which body is reenforced as to the spokes by metallic serpentine shaped pieces whose extremities are prevented from crawling or other displacement in the rubber body.

What is claimed is:—

1. An automobile wheel composed of a flanged metallic hub portion having bolts at spaced intervals extending through the flanges of the hub, serpentine shaped metallic pieces whose inner extremities are anchored to said bolts, end caps welded to the outer extremities of said pieces, and a rubber body molded to said structure and enclosing said bolts, serpentine shaped pieces and end caps.

2. In an automobile wheel, a flanged metallic hub having at spaced intervals bolts which connect the flanged portions of the hub, reenforcing serpentine shaped metallic pieces whose inner extremities are anchored to said bolts, caps welded to the outer ends of said pieces, and an internal rubber structure having a hub portion, a tread and continuous ring-like body between the hub and tread, and spokes whose inner ends connect with the hub and whose outer ends merge into the inner circumference of the tread, said rubber structure surrounding said bolts and also surrounding said reenforcing serpentine shaped pieces in the formation of the spokes.

3. An automobile wheel comprising a flanged metallic hub portion, spaced bolts connecting the flanges of said hub portion, spoke reenforcing serpentine shaped pieces whose inner ends are secured to said bolts, caps secured to the outer extremities of said pieces, a metallic hoop surrounding said caps and secured thereto, and an integral rubber structure having a hub, a tread, a continuous ring-like body between the hub and tread, and spokes, the hub portion of the rubber body surrounding said bolts while the reenforcing serpentine shaped pieces are embedded within the spoke portion, the metallic hoop being embedded within the tread portion of the rubber element.

4. An automobile wheel composed of an integral rubber structure having a hub, a tread, a continuous ring-like body between the hub and tread, and spokes arranged in pairs diametrically opposite, the spokes containing reenforcing serpentine shaped metallic pieces whose inner and outer ends are secured as against crawling movements.

In testimony whereof I affix my signature hereto.

WILLIAM G. WILSON.